Feb. 21, 1956
H. E. TRELEVEN
2,735,597
SPECTACLE HOLDER FOR ATTACHMENT TO A
PANEL SURFACE IN AN AUTOMOBILE
Filed Jan. 26, 1953
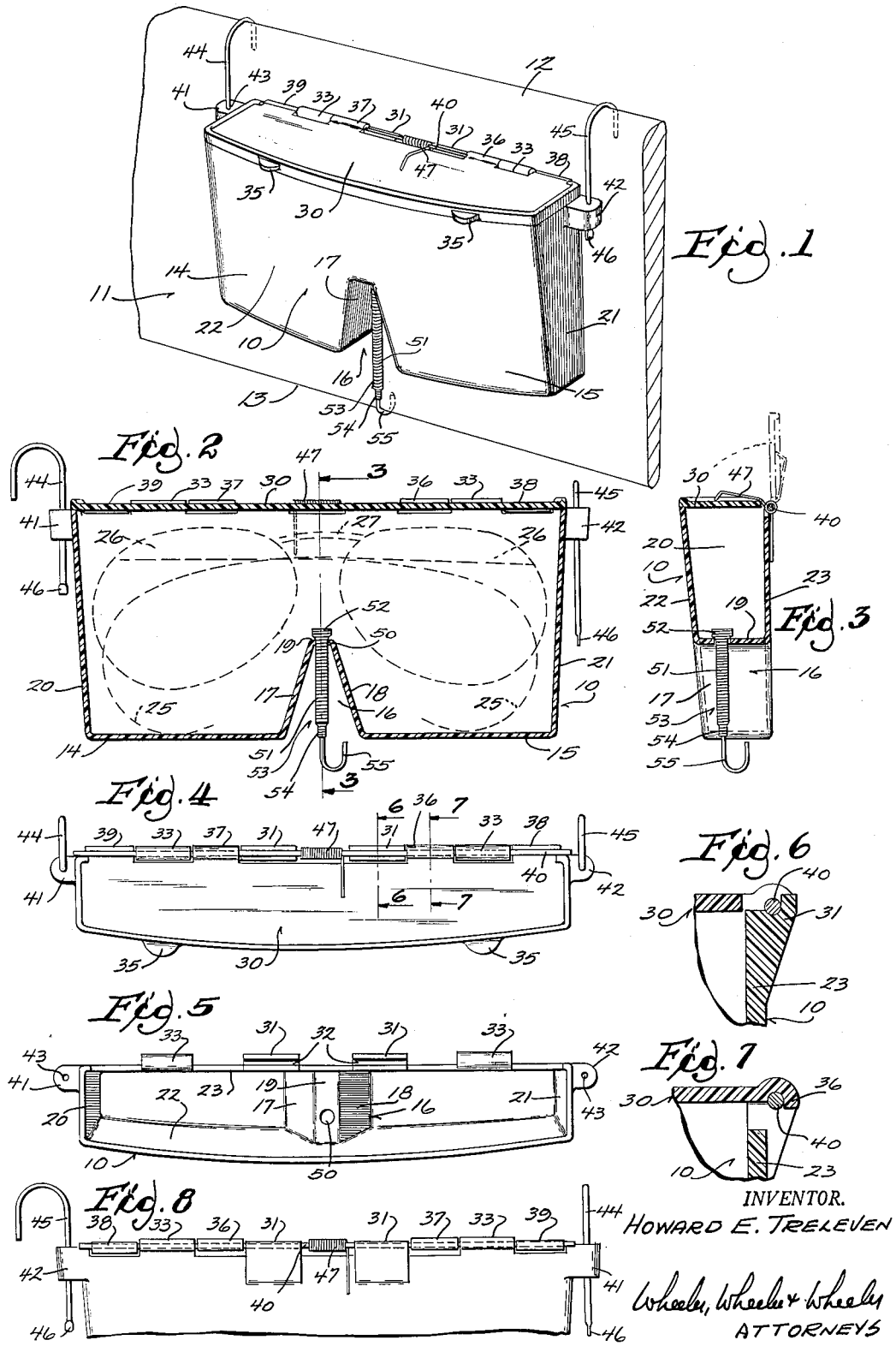
INVENTOR.
HOWARD E. TRELEVEN
Wheeler, Wheeler & Wheeler
ATTORNEYS United States Patent Office 2,735,597
Patented Feb. 21, 1956

2,735,597

SPECTACLE HOLDER FOR ATTACHMENT TO A PANEL SURFACE IN AN AUTOMOBILE

Howard E. Treleven, Fond du Lac, Wis., assignor to Tre Brothers Manufacturing Company, Fond du Lac, Wis., a corporation of Wisconsin Application January 26, 1953, Serial No. 333,061

2 Claims. (Cl. 224—29)

My invention relates to improvements in a spectacle holder for attachment to a panel surface in an automobile.

The mounting or attachment of a spectacle case in an accessible position in the interior of an automobile presents certain problems not only because eyeglass spectacles or sunglasses are frangible, but also because a suitable case to receive the various sizes and shapes of eyeglass spectacles may only be attached to surfaces or panels having limited area, and obviously the attachment must be of a temporary nature. A resilient member to be effective for the purpose of controlling a grappling or attaching means must have considerable range of movement. If a spring is used, the length of the spring must be substantial, and it must be so positioned that it will not damage the contents of the case. My invention meets these requirements.

The object of my invention is to provide a spectacle case having means for ready attachment to a panel, and to so shape the case as to provide a safe carriage for the spectacles, at the same time providing in conjunction therewith resilient mounting means whereby to attach the case to a relatively narrow panel.

Other objects will be apparent from the following description.

In the drawings:

Fig. 1 is a perspective of my spectacle case mounted upon a panel, here shown fragmentarily as a portion of the interior sun visor of an automobile.

Fig. 2 is a vertical section through the spectacle case shown in Fig. 1, a pair of spectacles being shown in dotted lines within the case.

Fig. 3 is a section on line 3—3 of Fig. 2.

Fig. 4 is a top plan view of the case shown in Fig. 1.

Fig. 5 is a view similar to Fig. 4 but with the hinged top removed.

Fig. 6 is a section on line 6—6 of Fig. 4, the back wall and top of my case being shown fragmentarily.

Fig. 7 is a section on line 7—7 of Fig. 4 with a portion of the top and of the back wall being shown fragmentarily.

Fig. 8 is a rear elevation of the top portion of my case with the cover in place and closed.

As indicated above, my spectacle case is attachable to a panel surface, and by this I mean a panel surface which has margins to be engaged or grappled by the attaching means which I provide as shown in the drawings. I have shown my spectacle case 10 mounted upon panel 11 comprising a sun visor of the type common in the interior equipment of the modern automobile. This sun visor is usually mounted above the windshield and is swingable to and from a sunshielding position. It has margins 12 and 13 which are engageable by fastening means such as those described below. Obviously the width of a panel 11 between the margins 12 and 13 will differ in different automobiles, and the means for attaching my spectacle case 10 to such a panel 11 or any panel surface must be sufficiently "universal" to satisfy grappling requirments for panels of different sizes. A sun visor panel of 5½" or 6" width is common, but some of lesser width are encountered. My case 10 is 2¾" from top to bottom.

As shown, my spectacle case is shaped to receive differing sizes and contours of spectacles and sunglasses. It is preferably made of light plastic having thin sections and I form it in two lobes 14 and 15 separated by a V-shaped member 16 having legs 17 and 18 which are downwardly divergent. The "apex" of the V-shaped member 16 is truncated as shown at 19 and the entire structure of my case 10 is thus provided with a structural member which performs a number of functions as will become more clear as the description of my case progresses.

The end walls 20 and 21, and the front wall 22 are downwardly convergent, this not only facilitates the moulding of my case 10 in plastic form, but also conforms to requirements universally of spectacles and sunglasses so that the temples 25 may be received parallel with the spectacle lenses 26 in the upper portion of the case which must also be wide enough to receive the bridge 27 of the spectacles. The legs of the V-shaped member extend from the front wall 22 to the back wall 23 with both of which walls the legs are attached or integral, and the V-shaped member 16 is therefore a structural brace between the front and back walls of the case which I find amply sufficient to stiffen the entire case structure despite the thinness of the walls. Furthermore, the V-shaped member 16 extends upwardly into the case sufficiently to constitute a brace and positioning device to locate the spectacles centrally of the case whereby to dispose the lenses 26 of the spectacles in their respective lobes 14 or 15.

My case 10 is provided with a top 30 hingedly connected along its rear margin along the back wall 23 of the case. For the purpose of the hinge connection, the upper margin of the back wall of the case is provided with buttressed hinge halves 31 shaped as shown in Figs. 6 and 7. These are relatively centrally positioned as shown in Fig. 5 and each of them is channeled at 32 to receive the hinge pintle. Somewhat outwardly spaced from these buttressed upwardly facing channeled hinge members 31, are downwardly facing channeled hinge members 33, likewise formed along the top margin of the back wall 23. These downwardly facing hinge members are channeled to receive the pintle along their downwardly facing surfaces. The top 30 has forwardly facing finger tabs 35 and has hinge members 36 and 37 with downwardly facing channels to receive a pintle, and these hinge members 36 and 37 are disposed between the hinge members 31 and 33. Then at the ends of the rear margin of the top 30, there are hinge members 38 and 39 with upwardly facing channeled surfaces. The channeled surfaces of all of these hinge members are aligned so that a single pintle 40 may be "laced" between them in a single assembly operation. A torsion spring at 47 biases the top to closed position.

At either end of the case adjacent its top margin there is a boss 41 and 42, respectively. Through each of these bosses is a bore 43 to receive a wire-like hooked hanger 44 and 45 respectively. Each of these wire hangers is flattened at 46 to provide a limit of movement of the hanger upwardly or outwardly from the case 10, but the bore is sufficiently large to permit ready retraction of each of the hangers to the extent permitted by the curve of the hook at the end of the hanger. The hooked hangers may be reciprocated to a retracted position, down alongside the case 10. The hooks of these hangers are receivable about the margin of a panel such as the margin 12 of panel 11 as shown in Fig. 1.

In the flat truncation of the V-shaped member at 19, I provide an aperture 50. Through this aperture I threadedly engage intermediate sized convolutions 51 of a tension spring which has larger convolutions at 52 of such dimension that they may not be received through aperture 50. I thus mount a tension spring 53 having its smallest convolutions 54 at its outer or lower extremity (see Fig. 2). Into these smallest convolutions 54 of spring 53, I threadedly engage hook 55 which has a gimlet thread at its extreme end (not shown).

The spring and hook construction just described supplies the needed engagement with margin 13 of panel 11 as shown in Fig. 1, and the V-shaped member 16 thus provides the mounting means for the resilient engagement of my case 10 with the panel. If the panel is of greater width, there is ample resilient extension for the hook 55, and the spring 53 is not so positioned as to interfere with or damage the spectacles carried in the case 10.

When it is realized that there is need for a wide range of dimensional requirements for any means for attaching a case 10 to a supporting structure or panel; and when it is realized that any resilient or adjustable attaching means might otherwise be extended into the case 10 in a position to damage the contents of the case; and when it is realized that a spectacle case must be made of light and fairly resilient material; it will be understood that the V-shaped member 16 constructed as described above in conjunction with a resilient mounting means 53—55, meets all of these problems and also helps to dispose the spectacles in their proper location centrally of the case; and it is realized that the above described construction with the V-shaped member 16 is a decided improvement over any heretofore known accessory case.

I claim:

1. A receptacle for spectacles having spaced front and rear walls forming interior lobe spaces for reception of the respective lenses of a pair of spectacles and providing an opening at the upper sides thereof to enable insertion and removal of the spectacles into and from the receptacle, and a movable top disposed at an angle to said front and rear walls closing said opening, the lobe spaces being separated by a receptacle wall in V configuration with the apex of the V spaced inwardly of the receptacle whereby said V-shaped wall delimits a zone of free space between the legs of the V, resilient attaching means for securing one side of the receptacle to a panel-like sun visor of an automobile, said attaching means being in said zone and connected to the receptacle only at said apex, further attaching means connected to the sides of said receptacle and extending in a direction opposite to that of said first-mentioned attaching means, and means for connecting said top to one of said spaced walls and means for retaining said top in closed position.

2. A receptacle according to claim 1 wherein the attaching means disposed in said V-shaped free space is a tension spring and includes a hook.

References Cited in the file of this patent
UNITED STATES PATENTS

| | | |
|---|---|---|
| 2,048,105 | Cobbs | July 21, 1936 |
| 2,181,324 | Glover | Nov. 28, 1939 |
| 2,211,879 | Cave | Aug. 20, 1940 |
| 2,278,011 | Murdock | Mar. 31, 1942 |
| 2,461,792 | Weaver | Feb. 15, 1949 |
| 2,542,409 | Guenther | Feb. 20, 1951 |